United States Patent [19]

Lagerberg

[11] Patent Number: 5,059,069
[45] Date of Patent: Oct. 22, 1991

[54] INSERT FOR THREAD CUTTING

[75] Inventor: Stig E. V. Lagerberg, Sandviken, Sweden

[73] Assignee: Sandvik AB, Sandviken, Sweden

[21] Appl. No.: 477,415

[22] Filed: Feb. 9, 1990

[51] Int. Cl.⁵ .................................................. B26D 1/00
[52] U.S. Cl. ..................................... 407/113; 407/114; 407/70; 82/13; 82/110
[58] Field of Search ................. 407/113, 114, 117, 70, 407/68, 24, 29, 19, 18, 67, 69; 82/13, 110

[56] References Cited

U.S. PATENT DOCUMENTS

| 1,988,770 | 1/1935 | Alexander | 407/24 |
| 3,636,602 | 1/1972 | Owen | 407/113 |
| 4,233,867 | 11/1980 | Zimmerman | 407/113 |
| 4,409,868 | 10/1983 | Huddle | 407/67 |
| 4,531,863 | 7/1985 | Smith | 407/113 |
| 4,572,042 | 2/1986 | Wiman | 407/113 |
| 4,572,713 | 2/1986 | Schmidt | 407/113 |
| 4,645,386 | 2/1987 | Smith | 407/113 |
| 4,854,785 | 8/1989 | Lowe et al. | 407/114 |
| 4,913,604 | 4/1990 | Zaengerle | 407/113 |

FOREIGN PATENT DOCUMENTS 0042201  3/1984  Japan ..................................... 407/70

Primary Examiner—Frederick R. Schmidt
Assistant Examiner—Blynn Shideler
Attorney, Agent, or Firm—Burns, Doane, Swecker & Mathis

[57] ABSTRACT

A thread cutting insert comprises a block having along one edge thereof a plurality of teeth for successively cutting a thread in a workpiece. The teeth are of successively increasing heights from a first to a last of the teeth. The first tooth has a smoothly convexly curved cutting edge, and the remaining teeth have a multi-sided cutting edge defined by three sides of a trapezoid.

10 Claims, 2 Drawing Sheets

INSERT FOR THREAD CUTTING

BACKGROUND OF THE INVENTION

The present invention relates to a thread-cutting insert for cutting screw threads into a workpiece.

Thread cutting inserts have been proposed which comprise a plurality of cutting teeth along one edge thereof. The teeth are of progressively increasing heights, as exemplified for example in U.S. Pat. No(s). 4,572,713 and 4,854,785.

When a metal tube material that has been subjected to rolling or drawing operations is to be provided with a threaded portion, a thread cutting insert is used to cut a thread into the tube. The insert, when engaging the outer surface portion of the tubular material, imposes a large amount of stress into a surface portion with small radii of profile. Further, the material is often non-circular which means that the insert is subjected to intermittent stress especially when threads on a conical profile are to be cut.

It is furthermore known that an insert having a large nose radius, or a circular insert, has an extended lifetime when engaging with a rolled surface area at intermittent stress than compared with an insert having a small nose radius.

When forming threads by successively cutting multiple groove profiles into the material by means of multiple cutting teeth, it is desirable to cut the completed thread with as few engagements or passes as possible. This means that it is desirable to cut with as large a feed depth as possible especially when cutting the first profile.

With prior art inserts for multiple thread cutting, the profiles of the teeth have been basically similar, but have a progressively varying dimension. This gives the result of engaging the material with a first tooth having a profile with small radii which are sensitive for deformation. This is disadvantageous especially when cutting threads in non-circular profile material where intermittent stresses are obtained.

SUMMARY OF A PREFERRED EMBODIMENT OF THE INVENTION

The present inventive idea involves an insert with multiple teeth for thread cutting wherein the first tooth profile is given a shape that exhibits maximum strength so as to be able to resist the stresses from the rolled surface of the workpiece and from intermittent stresses. The first tooth profile has such contour and is dimensioned so that the subsequently engaging tooth will not be subjected to the above-discussed unfavorable stresses. The shape of the first tooth also enables a relatively large feed depth to be made by the first tooth engagement with the workpiece, whereby the remaining teeth can make shallower cuts than is usually the case.

The thread-cutting insert comprises a block having along one edge thereof a plurality of teeth arranged to successively cut a thread in a workpiece. The teeth are successively larger from a first to a last of the teeth. The first of the teeth has a smoothly convexly curved cutting edge. At least some, but preferably all, of the remaining teeth have multi-side cutting edges.

Due to the smoothly convexly curved cutting edge of the first cutting tooth, that tooth is able to make a relatively large cut, whereby the remaining teeth may make a more moderate cut. This minimizes the number of passes which the insert must make through the workpiece in order to form the thread.

BRIEF DESCRIPTION OF THE DRAWINGS

The objects and advantages of the invention will become apparent from the following detailed description of preferred embodiments thereof in connection with the accompanying drawings, in which like numerals designate like elements and in which.

DETAILED DESCRIPTION OF PREFERRED EMBODIMENTS OF THE INVENTION

Figure 1:
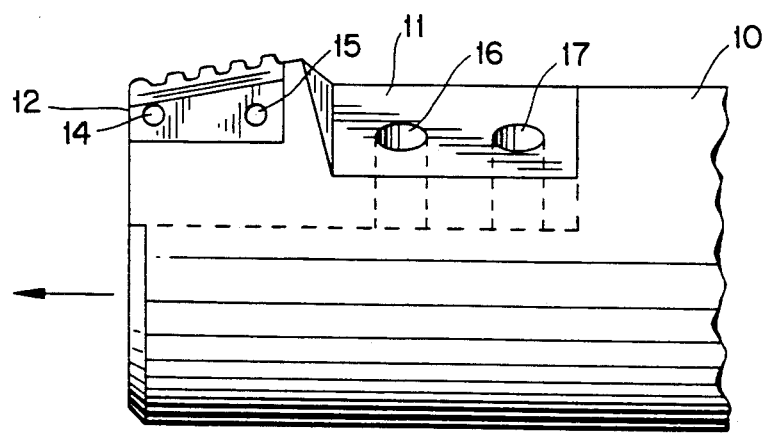
FIG. 1 is a longitudinal side view of a tool provided with a thread cutting insert according to the invention.
Figure 2:
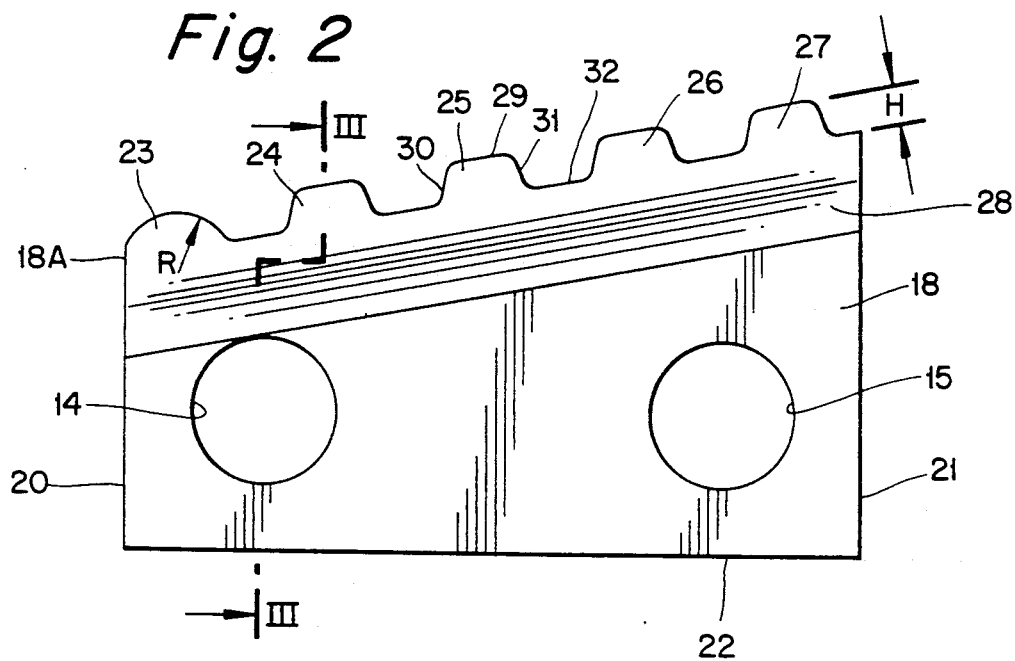
FIG. 2 is an enlarged top view of the thread cutting insert of FIG. 1.
Figure 3:
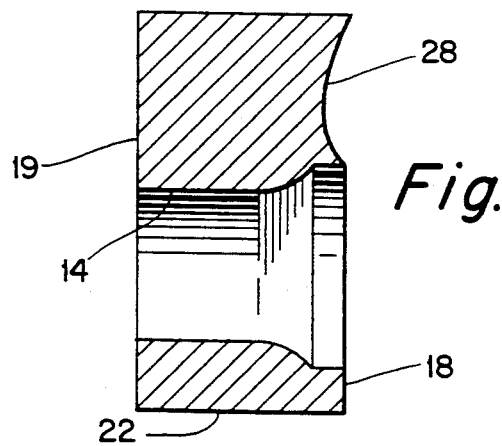
FIG. 3 is a cross-section taken along line III—III in FIG. 2.

Referring to the drawings, FIG. 1 illustrates a tool comprising a bar 10 provided with a holder or cartridge 11. In the cartridge 11 there is located a cutting insert 12, supported against complementary support surfaces of a recess. The insert and an underneath shim plate (not shown) being adapted to be clamped together in the cartridge 11 by means of clamping means such as threaded bolts (not shown) adapted to be engaged in bores 14, 15 passing through the insert and the shim plate. The cartridge 11 is similarly clamped in the bar with clamping means such as threaded bolts (not shown) engaging two radially disposed apertures 16, 17 passing through the cartridge.

The illustrated insert 12 of the invention is in the shape of a block and comprises a top surface 18 and a bottom surface 19 oriented parallel to each other. Additionally there are two surfaces extending transversely of the block defining parallel block end surfaces 20, 21 which function as end support surfaces. Those end surfaces 20, 21 extend at right angles from their intersections with the top and bottom surfaces. The remaining surfaces comprise longitudinally extending side surfaces, one of which is designated 22, and is planar in shape and located at right angles with the end, top, and bottom surfaces, so as to function as a side support surface when the insert is clamped in the cartridge 11.

The opposite side surface is serrated so as to define a whole number of cutting teeth 23, 24, 25, 26, and 27 which extend entirely within a space defined between planes defined by said top and bottom surfaces 18, 19. A first of the teeth 23 is disposed at a front end corner 18A of the block. The distance between the cutting teeth and the side support surface 22 progressively increases from the first tooth 23 to the last tooth 27. The teeth 23-27 are of progressively increasing height H from 23 to 27. A chip breaking groove 28 is formed on the top surface 18. The chip groove 28 defines the rake face of the insert 12 and comprises a depression initially increasing in depth in a direction away from the front end face of the cutting teeth and thereafter decreasing in depth in the same direction.

The cutting edge of each of the teeth 24, 25, 26 and 27 is multi-sided, preferably comprising three sides of a trapezoid including a planar top side surface 29 from which extend two tapering side flank portions 30, 31. The latter extend to the thread root or bottom 32.

The cutting edge of the initial tooth 23, however, has a smoothly curved convex contour. That curved first tooth 23 is able to make a relatively large cutting depth due to the strength of this smoothly convex curved tooth design. As a result, the remainder of the teeth can make more moderate depths of cut. By providing a smoothly convexly curved contour for the initial tooth 23, the insert exhibits improved resistance against stresses when cutting thread intermittently in a rolled surface.

Figure 4:
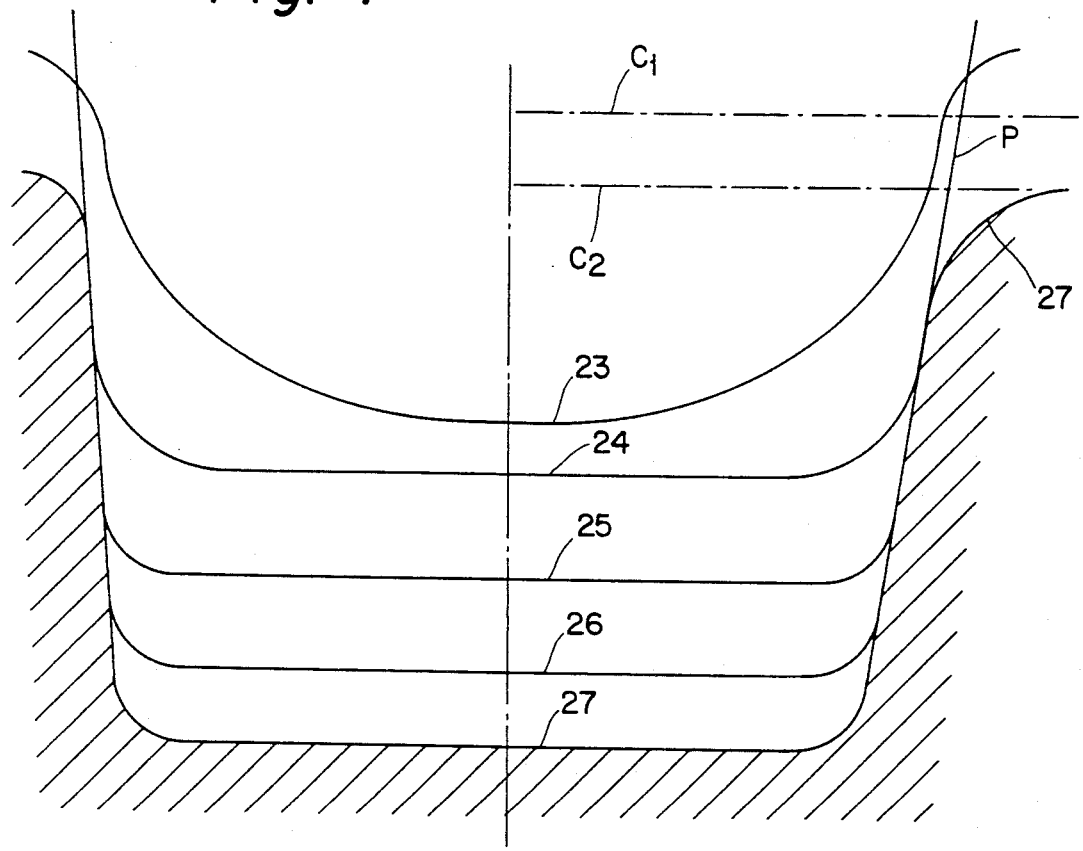
FIG. 4 is a view of successively approaching cutting teeth as seen by a point on a helical thread being cut by an insert according to the invention.

In the embodiment shown in FIG. 4 the profile of the initial tooth 23 is convexly curved with such a radius R, that a straight line P, which defines a line of taper for the thread flank 31 of tooth 27, is not intersected by the radius R of the initial tooth 23 during active cutting of a helical thread groove. This is depicted in FIG. 4 which represents the teeth as seen successively by a point on a helical groove being cut. $C_1$ designates the outer circumference of the tube in its as-rolled condition that is to be subject of thread cutting, whereas $C_2$ designates the outer circumference of the thread.

Figure 5:
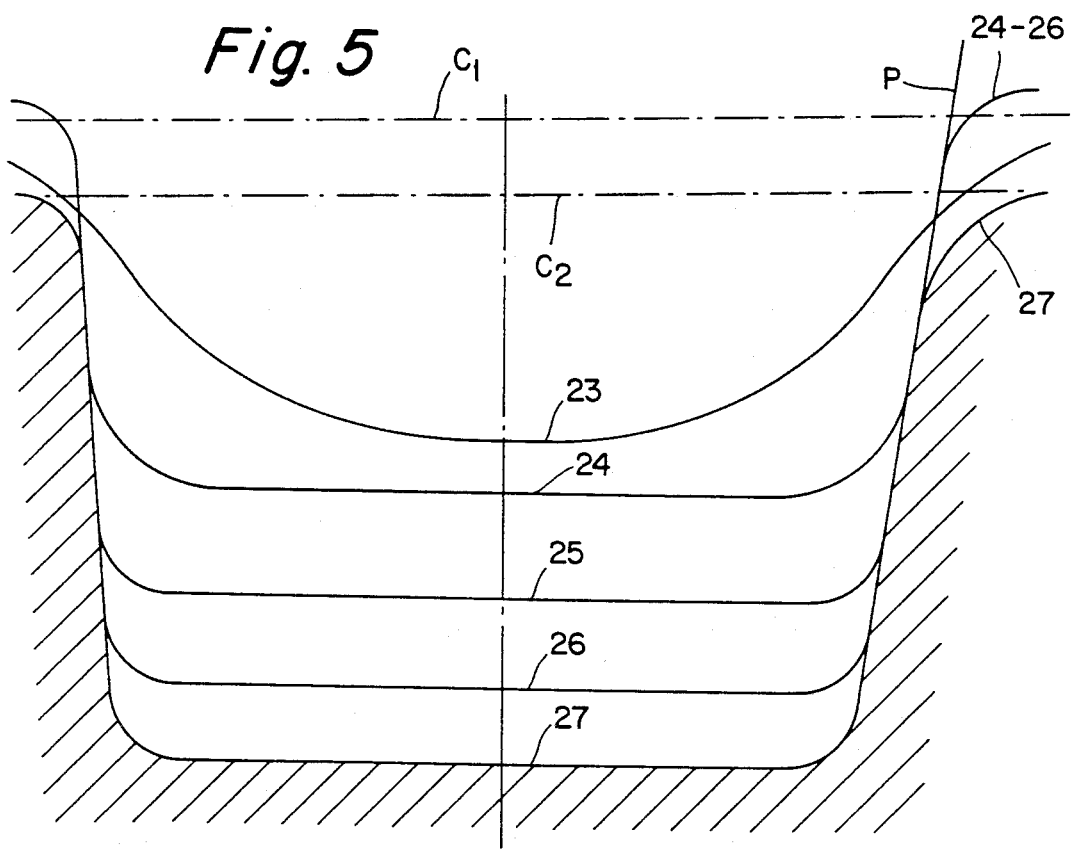
FIG. 5 is a view similar to FIG. 4 with an alternative embodiment of the insert of the invention.

In the embodiment in FIG. 5, the initial tooth 23 is provided with a sinusoidal shaped curve that intersects with said straight line P. In that way, the subsequent teeth 24–27 will engage with an already pre-turned surface.

Although the present invention has been described in connection with preferred embodiments thereof it will be appreciated by those skilled in the art that additions, modifications, substitutions, and deletions not specifically described may be made without departing from the spirit and scope of the invention as defined in the appended claims.

What is claimed is:

1. A thread-cutting insert for cutting a thread in a tubular metal workpiece, comprising a block having along one edge thereof more than two cutting teeth arranged to successively cut a thread in a workpiece, said teeth being successively larger from a first to a last of said teeth, said first of said teeth having a smoothly convexly curved cutting edge for initially cutting a helical groove of smoothly concavely curved profile, and each of the remaining teeth having a multi-sided cutting edge for reshaping said helical groove.

2. A thread-cutting insert according to claim 1, wherein said smoothly convexly curved cutting edge of said first tooth is defined by a radius.

3. A thread-cutting insert according to claim 1, wherein all of said remaining teeth having cutting edges defined by three sides, a second of said sides interconnecting the remaining two sides and being planar.

4. A thread-cutting insert according to claim 1, wherein said block includes another edge disposed opposite said one edge, said teeth spaced by successively increasing distances from said other edge.

5. A thread-cutting insert according to claim 1 including a depression formed in said block to define a chip breaker groove common to all of said teeth.

6. A thread-cutting insert according to claim 1, wherein said teeth are of successively increasing heights from said first to said last of said teeth.

7. A thread-cutting insert for cutting a thread in a tubular metal workpiece, comprising a block defined by parallel top and bottom surfaces and four edge surface extending therebetween, one of said edge surfaces including more than two cutting teeth extending entirely within a space defined between two planes containing said top and bottom surfaces, respectively, said teeth being of successively increasing heights from a first to a last of said teeth, another of said edge surfaces being situated opposite said one edge surface and defining an edge support surface, said teeth being spaced by successively increasing distances from said other edge, said first tooth having a smoothly convexly curved cutting edge for initially cutting a helical groove of smoothly concavely curved profile, each of the remaining teeth having a multi-sided cutting edge for reshaping said helical groove.

8. A thread-cutting insert according to claim 7, wherein said smoothly convexly curved cutting edge of said first tooth is defined by a radius.

9. A thread-cutting insert according to claim 7, wherein said remaining teeth have cutting edges defined by three sides of a trapezoid.

10. A thread-cutting insert according to claim 7, wherein said top surfaces includes a depression formed therein to define a chip breaking groove common to all of said teeth.

* * * * *